United States Patent Office 3,351,662
Patented Nov. 7, 1967

3,351,662
HYDROXYBENZALDEHYDE-ALIPHATIC ALDE-HYDE-POLYAMINE POLYCONDENSATES
Walter M. Chamot, Brookfield, Ill., assignor to Nalco Chemical Company, Chicago, Ill., a corporation of Delaware
No Drawing. Original application Aug. 30, 1960, Ser. No. 52,786, now Patent No. 3,184,294, dated May 18, 1965. Divided and this application Dec. 18, 1964, Ser. No. 419,551
4 Claims. (Cl. 260—566)

ABSTRACT OF THE DISCLOSURE

Essentially linear, oil soluble to oil dispersible condensation polymers, useful for improving color stabilization, sludge formation, and filterability and for retarding or inhibiting detrimental effects of oxidation in normally liquid petroleum distillate fractions, said polymers being condensation products of (a) organic polyamines with at least one primary amino group, including aliphatic diamines, poly alkylene polyamines and phenylene diamine, (b) formaldehyde or acetaldehyde and (c) hydroxy-benzaldehyde at a mol ratio of said hydroxybenzaldehyde to said organic polyamine of 1:0.5–1, respectively, and at a mol ratio of said aldehyde to said organic polyamine of 0.9–1.1:1, respectively.

---

This application is a division of my copending application Ser. No. 52,786, filed Aug. 30, 1960 and now Patent No. 3,184,294.

The invention claimed herein, in general, relates to hydroxybenzaldehyde-lower aliphatic aldehyde-organic polyamine polymeric condensates.

The compositions of this invention are essentially linear polymeric condensates prepared by the condensation of salicylaldehyde, an aliphatic, monofunctional aldehyde having 1–2 carbons, and a polyamine having at least one primary amino group, and preferably two primary amino groups. They are prepared by the reaction of the three compounds under controlled time and temperature conditions and at controlled molar ratios of reactants to provide polymeric condensates which have little, if any, crosslinking. The resulting products may be used as antioxidants in fuel oils, diesel oils and gasolines, particularly those consisting partly or wholly of cracked stock.

It is an object of this invention to provide new and useful polymeric condensates of salicylaldehyde, a lower aliphatic, monofunctional aldehyde and a polyamine.

Another object to to provide new chemicals which are antioxidants for petroleum fuel oils, diesel oils and gasolines.

A further object is to provide new chemicals which are antioxidants for cracked petroleum distillate products and blends thereof.

Still another object to to provide new and useful chemical compositions containing the aforesaid polymers. Other objects will appear hereinafter.

The compositions produced according to the principles of this invention are essentially polymers prepared by condensing a hydroxybenzaldehyde, e.g., salicylaldehyde, a lower aliphatic, monofunctional aldehyde, and a polyamine at predetermined molar ratios so as to obtain a substantially linear condensation polymer. The molar ratios of salicylaldehyde to polyamine is in the range of 1:0.5–1, respectively, and the molar amount of the aliphatic aldehyde is within the range of 0.9–1.1 times the mols of the polyamine. These molar ratios produce petroleum-soluble, essentially linear condensation polymers which are eminently suitable as stabilizers for gasolines, diesel oils, fuel oils, and the like. In the most preferred form of the invention, the molar ratio of the salicylaldehyde to the aliphatic aldehyde to the polyamine is about 1:1:1, respectively. The polymers produced in accordance with the invention are polymers ranging in molecular weight from about 500 to as high as about 10,000 and varying from viscous liquids to solid compositions, all of which are oil-soluble or at least oil-dispersible at low concentrations.

Broadly speaking, the compositions are the reaction products of (1) a hydroxybenzaldehyde, e.g., salicylaldehyde, (2) a lower aliphatic, monofunctional aldehyde, preferably formaldehyde or its lower homopolymers which break down into formaldehyde under conditions of condensation, e.g., paraformaldehyde, and (3) a polyamine.

Formaldehyde in any of its commercially available forms such as formalin (an aqueous formaldehyde solution), formcels (alcoholic solutions of formaldehyde), paraformaldehyde, and trioxane may be employed. Acetaldehyde may also be used.

The polyamine component may be an aliphatic or aromatic diamine or a polyalkylene polyamine. There must be at least one primary amino group, preferably two. The aliphatic diamine preferably is an alkylene diamine, a diamino alkyl ether, or a diamino alkyl thioether wherein the total number of carbons in these aliphatic diamines is from 2–6. The aromatic diamines are preferably monocyclic aryl diamines such as the various isomeric forms of phenylene diamine and the isomeric forms of phenylene diamine having substituted on the phenylene ring one or two alkyl groups of 1–4 carbons. The polyalkylene polyamines preferably have two carbon or three carbon alkylene groups and have three to about ten amino groups, most preferably 3–5 amino groups.

Ethylene diamine, propylene diamine, tetramethylene diamine, pentamethylene diamine, hexamethylene diamine are examples of alkylene primary diamines which may be used in preparing the compositions of this invention. Presently, ethylene diamine and hexamethylene diamine are the two most available in commercial quantities. Substituted alkylene diamines such as N-ethyl ethylene diamine and N-hydroxyethyl ethylene diamine, may also be used. Other examples are diamino ethyl ether, diamino ethyl thioether and p-phenylene diamine.

Diethylene triamine, triethylene tetramine and tetraethylene pentamine are examples of polyalkylene polyamines having two primary amino groups. Others include corresponding polypropylene polyamines, 1,2- or 1,3-dipropylene triamine, 1,2- or 1,3-tripropylene tetramine, and 1,2- or 1,3-tetrapropylene pentamine. Other polyamine compositions which may be used are compositions which are higher homologs of the foregoing polyamines and which are usually available as mixtures obtained as residues in the production of the foregoing polyamines. The polyalkylene polyamines may be partially substituted as, for example, monoamido polyalkylene polyamines and N-alkyl or N-hydroxyalkyl substituted polyalkylene polyamines having at least one primary amino group.

The condensation of the salicylaldehyde, the aliphatic aldehyde, and the polyamine involves the reaction of the aliphatic aldehyde and also the reaction of the aldehyde group of the salicylaldehyde. There is reason to believe that the aldehyde group of the salicylaldehyde reacts with a primary amino nitrogen to form a connecting bridge between the aromatic ring of the salicylaldehyde and the polyamine and that the connecting bridge is a methylene imine radical. Another name for the same radical is an azomethine radical. The radical has the formula, —CH=N—. The characteristic grouping containing said radical in the condensation polymer is

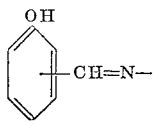

wherein the nitrogen is the nitrogen of a primary amino group of the polyamine.

There is reason to believe that the aliphatic aldehyde, on the other hand, reacts in a different manner. Using formaldehyde as an example, it can form in the condensation reaction methylene bridges, —CH$_2$—, between the aromatic rings of two salicylaldehyde molecules and/or the aromatic ring of a salicylaldehyde molecule and an amino nitrogen. There is a possibility of methylene bridge formation between amino nitrogens of two polyamine molecules, but only minor amounts, if any, would be expected.

The probable characteristic groupings of the reactant molecules in the condensation polymers of this invention are:

(a) 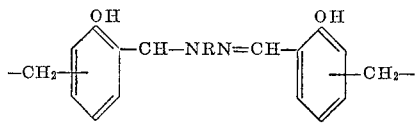

(b) 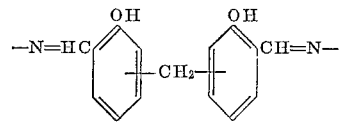

(c) 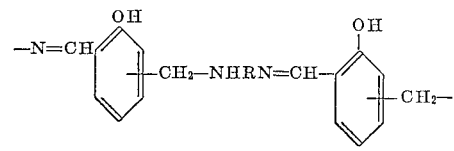

(d) 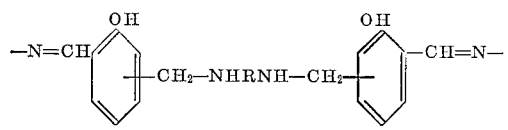

(e)            NRNH—CH$_2$—NHRN

In the above formulae, R is the residue of any one of the aforedescribed polyamines. The methylene groups are probably attached to the aromatic rings at ortho- or para-positions with relation to the —OH group.

The condensation reaction is preferably conducted at temperatures in the range of 50–160° C. The preferred procedure is to mix first the salicylaldehyde and polyamine, and thereafter add slowly to said mixture at an initial mixture temperature of about 0–50° C. the aliphatic aldehyde. The temperature during addition or after addition of the aliphatic aldehyde is allowed to rise above 50° C. The water of reaction and any water introduced with the reactant chemicals is distilled at least by the end of the reaction period, which is usually one-half to three hours. A vacuum is applied to accomplish this purpose, if necessary.

Formalin is an example of an aqueous formaldehyde solution of about 75% concentration. Special precautions usually are employed when the aldehyde reactant is an aqueous solution, such as formalin. For example, it is necessary to remove the water of the formalin solution during or after the condensation reaction—e.g., by application of vacuum to the reaction vessel or by dissolving the condensation product during the condensation reaction in a water-immiscible solvent such as benzene, and then separating the water and solvent. The condensation takes place in the presence of water, but it is necessary to separate the water from the reactants during the condensation reaction if high degrees of condensation are to be achieved.

The following examples illustrate particular composition of the present invention. The number of mols of reactants indicated is calculated on the basis of the active ingredient.

*Example 1*

Salicylaldehyde and diethylenetriamine are mixed at a 1:1 molar ratio with the mixture at room temperature. Formalin is added in small increments, and the temperature is maintained during the addition at 25–40° C. After a molar quantity of formaldehyde equal to the molar amount of salicylaldehyde has been added, the mixture is stirred for one hour. The water is decanted from the reaction product, and the condensation is completed by heating under vacuum the decanted reaction product at 95–100° C. for one hour.

*Example 2*

Equal molar amounts of ethylene diamine and salicylaldehyde are mixed and brought to 30° C. Paraformaldehyde is added in small increments with the temperature being held at 65–80° C. until the equivalent amount of formaldehyde in the added paraformaldehyde equals the molar amount of salicylaldehyde. The reaction mass is then brought to 140–150° C. and held there for one-half hour.

The products produced in the above examples are readily soluble in such solvents as benzene, isopropanol and methyl alcohol and are soluble in gasoline and similarly related liquid hydrocarbons in the concentrations employed in antioxidant or stabilization treatment thereof.

Solutions of 5–50% strength of the compositions of this invention, when incorporated into gasolines, domestic fuel oils, diesel oils and the like at solution dosages between about 0.5 to 1000 p.p.m., provide a color stabilization of said oils and also improve the filtration rate thereof. The proper dosage to obtain optimum oxidation stabilization will vary between different stocks, but treatments of about 10–50 p.p.m. by weight will provide good results in most instances. This is applicable to straight run distillates, catalytically cracked distillates, thermally cracked distillates, and blends thereof.

Although it is not absolutely essential for the purposes of this invention to combine the foregoing condensation polymers with the reaction product of formaldehyde and a primary or secondary aliphatic monoamine, it is preferred to use the two compositions in the oil additive. One embodiment of this invention is the combination of (1) said condensation polymers and (2) the reaction product of primary or secondary aliphatic monoamines and formaldehyde as new compositions of matter, with or without solvents. The amine-formaldehyde reaction products are prepared by mixing together at room temperature formaldehyde solution, aqueous or alcoholic, with aliphatic primary and secondary monoamines, the amine preferably containing at least 8 carbons in the aliphatic group or groups. These amines include dibutylamine, diamylamine, octylamine, nonylamine, dodecyl amine, octadecyl amine, etc.

In general, the formulations serving as additives for the higher boiling fractions of petroleum oils will comprise the aforementioned active ingredients along with a cosolvent such as lecithin or an alcohol, and hydrocarbon carriers, either aromatic, aliphatic or mixtures thereof. These compositions are typified by the following general compositions:

| | By weight |
|---|---|
| Salicylaldehyde-aliphatic aldehyde-polyamine condensation polymer | 5 to 50% or 1–10 parts. |
| Aliphatic monoamine-formaldehyde reaction product | 5 to 50% or 1–10 parts. |
| Lecithin | 0 to 20% or 0–4 parts. |
| Hydrocarbon solvent | As required. |

The following are examples of formulations, principally in concentrated forms, of treating agents within the scope of this invention. The percentages given are by weight.

*Example 3*

| | Percent |
|---|---|
| Condensation polymer of Example 1 | 20 |
| Monoamine-formaldehyde reaction product | 25 |
| Aliphatic solvent (Bronoco 365) | 30 |
| Aromatic hydrocarbon solvent (Bronoco 100 WR) | 20 |
| Lecithin | 5 |

*Example 4*

| | Percent |
|---|---|
| Condensation polymer of Example 1 | 30 |
| Monoamine-formaldehyde reaction product | 35 |
| Isopropanol | 15 |
| Aromatic hydrocarbon solvent (Bronoco 100 WR) | 20 |

*Example 5*

| | Percent |
|---|---|
| Condensation polymer of Example 2 | 37.5 |
| Monoamine-formaldehyde reaction product | 47.5 |
| Isopropanol | 15.0 |

Lecithin, isopropanol, aromatic hydrocarbons and aliphatic hydrocarbons are solvents with different solvency characteristics. The selection of a solvent or combination of solvents is largely dependent on the nature and the amounts of the other components in the formulation and can be varied considerably with different concentrations of the individual ingredients.

The effectiveness in color stabilization of various distillates by the condensate of Example 1 was ascertained in high temperature tests. In the high temperature tests the oils containing the color stabilizer of Example 1 were held at 150° C. for 90 minutes, and the color of the oil was ascertained at the end of the testing period. The results of the tests with the color stabilizing composition of Example 1 at solution dosages of 250 p.p.m. are summarized in the following table. Oil X is a No. 2 cracked oil consisting of 100% thermally cracked distillate. Oil Y is a blended No. 2 distillate fuel comprising 70% straight run distillate and 30% thermally cracked distillate.

TABLE I.—HIGH TEMPERATURE TESTS

| Active Ingredients | Oil X | | Oil Y | |
|---|---|---|---|---|
| | N.P.A. Color | Filter Pad | N.P.A. Color | Filter Pad |
| None | 8 | 16–18 | 8 | 20 |
| 50 p.p.m. salicylaldehyde-formaldehyde-diethylene triamine condensate of Example 1 | 3½ | 13 | 4½ | 17 |

The filter pad test is conducted by filtering the oil through No. 1 Whatman filter paper. The dark colored sludge remaining on the filter paper is compared with a standard set of filter pads which are progressively darker as the index number increases.

The effectiveness of the condensation polymer of Example II in antioxidant activity in a middle distillate diesel fuel oil, distillation range 325–650° F., during storage at 110° F., and in contact with air was measured in terms of color stability of the diesel oil after storage for 6 weeks and 13 weeks and by the amount of sludge developed in the 13-week storage period. The added amount by weight, based on the diesel oil, of a 2.5% solution of the condensate polymer of Example II was 50 p.p.m. The results are reported in the following table.

TABLE II

| Antioxidant | N.P.A. Color | | Sludge, mg./100 ml. after 13 weeks |
|---|---|---|---|
| | 6-week | 13-week | |
| None (control) | 7+ | 7 | 54.6 |
| Example II | 4½ | 6– | 26.8 |

The sludge weight was determined by the following procedure. Three pads of filter paper are placed in the Gooch crucible. Ten ml. of distilled water are poured over the pads and suction is applied. The sample of oil (400 ml.) is filtered through the crucible. The bottle is washed with three 15 ml. portions of Skellysolve "C" (Skelly Oil Company) to remove all traces of oil. The washings are filtered through the crucible and the crucible is washed with another 15 ml. portion of Skellysolve "C" (Skelly Oil Company).

The crucible is then placed on a clean crucible holder over a clean suction flask. Two 8 ml. portions of 50% acetone-50% dimethylformamide by volume are added to the bottle to dissolve the sludge remaining on the side and bottom of the bottle. This solution is passed through the crucible. The bottle is washed with three 8 ml. portions of 50% acetone-50% dimethylformamide by volume and the washings are filtered through the crucible. Two 8 ml. portions of 50% acetone-50% dimethylformamide by volume are used to wash down the side of the crucible. Suction is applied during the addition of each portion of solvent. The filtrate in the flask is then poured into a weighed 100 ml. beaker. The suction flask is washed with two 8 ml. portions of 50% acetone-50% dimethylformamide by volume and the washings are added to the beaker. The beaker is placed on the hot plate or in the air jet evaporator for 1½ to 3 hours at 150°–160° C. to remove the solvent.

Care must be exercised so that the air stream will not blow liquid droplets out of the beaker. The beaker is then cooled in a dessicator for two hours and weighed. A tare beaker is carried through the same operations to eliminate errors due to procedure. The increase in the weight of the beaker is then divided by four to obtain sludge weight in milligrams per 100 ml. of oil.

It will be seen from the foregoing description and data that my new condensate polymers of a hydroxybenzaldehyde, formaldehyde and a polyamine have desirable properties in retarding or inhibiting the detrimental effects of oxidation of normally liquid, petroleum distillate fractions such as gasolines, diesel oils, fuel oils and the like. In proper dosages, they will improve the color stability, sludge forming tendency, and/or filterability of such distillate fractions.

The invention is hereby claimed as follows:

1. A linear condensation polymer of a hydroxybenzaldehyde, an aliphatic aldehyde selected from the group consisting of formaldehyde and acetaldehyde, and an organic polyamine selected from the group consisting of (A) aliphatic diamines selected from the group consisting of an alkylene diamine of the formula $H_2N-R-NH-R_1$ wherein R is a member selected from the group consisting of a hydrocarbon alkylene group, said alkylene group containing 2–6 carbons, and where $R_1$ is a member selected from the group consisting of hydrogen, ethyl and hydroxyethyl, and a diamine of the formula

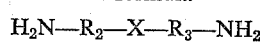

$$H_2N-R_2-X-R_3-NH_2$$

wherein $R_2$ and $R_3$ are alkylene groups having a total of 2–6 carbons and X is a member selected from the group consisting of sulfur and oxygen; (B) a phenylene diamine of the formula

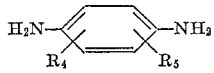

wherein $R_4$ and $R_5$ are each a member selected from the group consisting of hydrogen and alkyl of 1–4 carbons; and (C) polyalkylene polyamines with at least one primary amino group, alkylene groups with 2–3 carbons each and 3–10 amino groups per molecule; said hydroxybenzaldehyde, said aldehyde and said organic polyamine being condensed in said linear condensation polymer at a mol ratio of said hydroxybenzaldehyde to said organic polyamine in the range of 1:0.5–1, respectively, and at a mol ratio of said aliphatic aldehyde to said polyamine in the range of 0.9–1.1:1, respectively.

2. A condensation polymer as claimed in claim 1 wherein said hydroxybenzaldehyde is salicylaldehyde, said aliphatic aldehyde is formaldehyde and said organic polyamine is said polyalkylene polyamine with 3–5 amino groups per molecule, and nuclei of said salicylaldehyde and nuclei of said organic polyamine are linked in said polymer by —$CH_2$=N— and —$CH_2$— bridges.

3. A condensation polymer as claimed in claim 1 wherein said hydroxybenzaldehyde is salicylaldehyde, said aliphatic aldehyde is formaldehyde and said organic polyamine is said alkylene diamine, and nuclei of said salicylaldehyde and nuclei of said organic polyamine are linked in said polymer by —$CH_2$=N— and —$CH_2$— bridges.

4. A condensation polymer as claimed in claim 1, said polymer being oil-soluble to oil-dispersible and having a molecular weight in the range of about 500–10,000.

References Cited
UNITED STATES PATENTS 2,178,536  11/1939  Clifford _____ 260—51.5
2,731,425  1/1956  Juda et al. _____ 260—51.5

WILLIAM H. SHORT, *Primary Examiner.*

SAMUEL H. BLECH, MURRAY TILLMAN,
*Examiners.*

E. M. WOODBERRY, *Assistant Examiner.*